United States Patent
Sobczyk et al.

(10) Patent No.: US 12,440,118 B2
(45) Date of Patent: Oct. 14, 2025

(54) SYSTEM AND METHOD FOR DETERMINING ARTERIAL INPUT FUNCTION BASED ON SUSCEPTIBILITY CONTRAST IN THE CHOROID PLEXUS

(71) Applicant: THORNHILL SCIENTIFIC INC., North York (CA)

(72) Inventors: Olivia Sobczyk, Etobicoke (CA); Ece Su Sayin, Windsor (CA); David Mikulis, Oakville (CA); Joseph Arnold Fisher, Thornhill (CA); James Duffin, Toronto (CA)

(73) Assignee: THORNHILL SCIENTIFIC INC., North York (CA)

( * ) Notice: Subject to any disclaimer, the term of this patent is extended or adjusted under 35 U.S.C. 154(b) by 292 days.

(21) Appl. No.: 18/114,436

(22) Filed: Feb. 27, 2023

(65) Prior Publication Data
US 2023/0270348 A1   Aug. 31, 2023

Related U.S. Application Data

(60) Provisional application No. 63/314,014, filed on Feb. 25, 2022.

(51) Int. Cl.
*A61B 5/055*   (2006.01)
*A61B 5/026*   (2006.01)
*A61B 6/50*   (2024.01)

(52) U.S. Cl.
CPC ............ *A61B 5/055* (2013.01); *A61B 5/0263* (2013.01); *A61B 6/507* (2013.01)

(58) Field of Classification Search
CPC ........ A61B 5/055; A61B 5/0263; A61B 6/507
See application file for complete search history.

(56) References Cited

U.S. PATENT DOCUMENTS

| | | | | |
|---|---|---|---|---|
| 5,352,979 A | * | 10/1994 | Conturo | ............ G01R 33/5601 600/420 |
| 2004/0218794 A1 | | 11/2004 | Kao et al. | |
| 2016/0220115 A1 | | 8/2016 | Fisher et al. | |

FOREIGN PATENT DOCUMENTS

| | | |
|---|---|---|
| CA | 2758393 A1 | 10/2009 |
| CA | 2845308 A1 | 11/2012 |
| WO | WO-2021137196 A1 | 7/2021 |
| WO | WO-2023286040 A1 | 1/2023 |

OTHER PUBLICATIONS

Ghersi-Egea, Jean-Francois, et al. "Molecular anatomy and functions of the choroidal blood-cerebrospinal fluid barrier in health and disease." Acta Neuropathologica 135 (2018): 337-361.
(Continued)

*Primary Examiner* — Gerald Johnson
(74) *Attorney, Agent, or Firm* — Perry + Currier Inc.

(57) ABSTRACT

Conventionally, the arterial input function is determined by administering a contrast agent and measuring the responsive magnetic signal in a reference voxel located in a large artery such as the middle cerebral artery. By instead measuring the signal in a voxel of the choroid plexus, a more accurate profile for the arterial input function may be obtained. The metabolic activity in the choroid plexus is negligible, which provides greater certainty for signal sampling.

9 Claims, 9 Drawing Sheets
(2 of 9 Drawing Sheet(s) Filed in Color)

(56) References Cited

OTHER PUBLICATIONS

Zhao, L., et al. "Non-invasive measurement of choroid plexus apparent blood flow with arterial spin labeling." Fluids and Barriers of the CNS 17.1 (2020): 58-58.
Vu, Chau, et al. "Quantitative perfusion mapping with induced transient hypoxia using BOLD MRI." Magnetic resonance in medicine 85.1 (2021): 168.
Poublanc, Julien, et al. "Perfusion MRI using endogenous deoxyhemoglobin as a contrast agent: Preliminary data." Magnetic resonance in medicine 86.6 (2021): 3012-3021.
Sayin, Ece Su, et al. "Investigations of hypoxia-induced deoxyhemoglobin as a contrast agent for cerebral perfusion imaging." Human Brain Mapping 44.3 (2023): 1019-1029.
Balaban, Dahlia Y., et al. "The in-vivo oxyhaemoglobin dissociation curve at sea level and high altitude." Respiratory Physiology & Neurobiology 186 (2013): 45-52.
Madhukar, et al. "Choroid plexus: normal size criteria on neuroimaging." Surgical and radiologic anatomy 34 (2012): 887-895.
Sayin et al., "Cerebral Perfusion Imaging: Hypoxia-Induced Deoxyhemoglobin or Gadolinium?" BioRxiv; Nov. 10, 2021.
Faraci, Frank M., "Vascular effects of acetazolamide on the choroid plexus." Journal of Pharmacology and Experimental Therapeutics 254.1 (1990): 23-27.
Kazemi, H., et al. "Dynamics of oxygen transfer in the cerebrospinal fluid." Respiration Physiology 4.1 (1968): 24-31.
Hoiland, R. L et al., "Regulation of the cerebral circulation by arterial carbon dioxide. Compr Physiol 9: 1101-1154." (2019).
Bleeker, Egbert JW et al., "Optimal location for arterial input function measurements near the middle cerebral artery in first-pass perfusion MRI." Journal of Cerebral Blood Flow & Metabolism 2009.29 (2009): 840-852.
Idowu, O. E., et al. "Size, course, distribution and anomalies of the middle cerebral artery in adult Nigerians." East African medical journal 79.4 (2002): 217-220.
Arteaga, Daniel F., et al. "The vascular steal phenomenon is an incomplete contributor to negative cerebrovascular reactivity in patients with symptomatic intracranial stenosis." Journal of Cerebral Blood Flow & Metabolism 34 (2014): 1453-1462.
Lee, DongKyu, et al. "Whole-brain perfusion mapping in mice by dynamic BOLD MRI with transient hypoxia." Journal of Cerebral Blood Flow & Metabolism 42.12 (2022): 2270-2286.
Thomas, Binu P., et al. "Physiologic underpinnings of negative BOLD cerebrovascular reactivity in brain ventricles." Neuroimage 83 (2013): 505-512.

* cited by examiner

SYSTEM AND METHOD FOR DETERMINING ARTERIAL INPUT FUNCTION BASED ON SUSCEPTIBILITY CONTRAST IN THE CHOROID PLEXUS

CROSS-REFERENCE TO RELATED APPLICATION(S)

This application claims the benefit of U.S. provisional application entitled "THE CHOROID PLEXUS AS AN OBJECT OF INVESTIGATION AND SOURCE OF ARTERIAL INPUT FUNCTION FOR HEMODYNAMIC MEASURES IN THE BRAIN" having Ser. No. 63/314,014, filed 25 Feb. 2022 and incorporated by reference herein.

FIELD

The present specification is directed to perfusion magnetic resonance imaging (MRI), and specifically dynamic susceptibility contrast MRI.

BACKGROUND

Many common conditions such as cigarette smoking, high blood cholesterol, obesity, sedentary lifestyle, diabetes, hypertension, and aging result in silently accumulating cerebrovascular pathologies which can be assessed by perfusion metrics calculated using dynamic susceptibility contrast (DSC). A considerable source of error in the calculation of perfusion metrics is the arterial input function (AIF) which is derived from a signal measured over the middle cerebral artery (MCA). The signal profile of the AIF in the MCA may vary with the location of the selected voxel and its overlap with adjacent tissue including veins, cerebral spinal fluid (CSF), and brain parenchyma due to volume averaging effects. Additionally, the AIF is further confounded by peak truncation, also called signal saturation effects, and contrast agent non-linearity. Consequently, known methods cannot consistently evaluate the AIF.

Since determining the arterial input function is the first step in calculating other hemodynamic values such as mean transit time and cerebral blood flow, current methods can only determine relative hemodynamic values with sufficient certainty; they cannot determine absolute values which are needed to measure the effects of summation factors on a parameter, verify theoretical predictions such as those obtained from simulations, identify the dominant source of an error in measurements, and assess correlation of individual datapoints between experiments.

The present specification provides an improved system and method for determining the AIF based on MRI measurements in the subject's choroid plexus (CP).

SUMMARY

It is an aspect of the present specification to provide a method for determining an arterial input function based on a magnetic signal measured in the subject's choroid plexus.

The above aspects may be attained by inducing a change in concentration of a contrast agent in a subject. A first set of magnetic signals is measured in a reference voxel, responsive to the change in concentration of the contrast agent. Rather than using the middle cerebral artery, the reference voxel is in the subject's choroid plexus. Based on the set of magnetic signals, an arterial input function is computed and output at a display.

Optionally, the method includes measuring a set of magnetic signals in a selected voxel responsive to the change in concentration of the contrast agent. A perfusion metric for the selected voxel may be calculated based on the set of magnetic signals measured at the selected voxel and further based on the arterial input function. The perfusion metric may be absolute mean transit time, relative cerebral blood flow, or relative cerebral blood volume if Gd is used as the contrast agent. Since absolute [dOHb] is known when dOHb is used as the contrast agent, the true concentration of dOHb in the artery is known and therefore the arterial input function is known in absolute terms enabling the absolute CBF and CBV to be calculated. The method may include identifying an abnormality in the selected voxel based on the perfusion metric.

Optionally, the contrast agent is a gadolinium-based contrast agent and the change in concentration of contrast agent is induced by intravenously administering an amount of the gadolinium-based contrast agent to the subject. In this case the gadolinium is dispersed in the blood and the concentration is not known, so that only relative CBF and relative CBV can be calculated.

Optionally, the contrast agent is deoxyhemoglobin. In examples where the contrast agent is deoxyhemoglobin, the change in concentration of contrast agent may be induced by controlling a sequential gas delivery device to target a first end-tidal pressure of oxygen and carbon dioxide in the subject and then targeting a second end-tidal partial pressure of oxygen and carbon dioxide in the subject. The desired concentrations of deoxyhemoglobin can be targeted via targeting the corresponding arterial $PO_2$ and arterial $PCO_2$ using the oxyhemoglobin-dissociation curve as disclosed in Balaban et al. *Respiratory Physiology & Neurobiology* 186 (2013) 45-52.

In examples where the contrast agent is deoxyhemoglobin, the method may further include measuring a first end-tidal partial pressure of oxygen in the subject while inducing the change in the concentration of the deoxyhemoglobin. To compute the arterial input function, the first and second end-tidal partial pressure of oxygen and carbon dioxide are converted into a first and second concentration of deoxyhemoglobin respectively, the first and second concentrations of deoxyhemoglobin are temporally aligned with the first and second magnetic signals respectively. The time-concentration profile of this signal whether calculated or measured in a voxel over an artery is the AIF.

Optionally, the above steps may be repeated for a second voxel in the subject's choroid plexus in order to select an alternate voxel that outputs an accurate AIF. Another set of magnetic signals may be measured at the choroid plexus and the arterial input function may be recalculated based on the magnetic signals measured at the choroid plexus. Either voxel at the MCA or the voxel at the choroid plexus, or the calculated timed deoxyhemoglobin concentration may be selected as the reference voxel for the arterial input function depending on the fidelity to the input profile.

It is a further aspect of the specification to provide a system for determining the arterial input function. The system includes a magnetic resonance imaging device, a processor, and a display. The magnetic resonance imaging device is configured to measure a set of magnetic signals for a reference voxel corresponding to a region of interest in the subject's choroid plexus, responsive to a change in concentration of a contrast agent in the voxel as the contrast agent passes through the CP. The processor is configured to receive the set of magnetic signals from the magnetic resonance imaging device and further configured to compute an arterial input function based on the set of magnetic signals. In particular, the arterial input function may be calculated as the change in signal over time as the contrast agent passes through the CP. The display is configured to receive the changes of signal from the processor and further configured to output the arterial input function.

Optionally, the processor is further configured to measure another set of magnetic signals for a selected voxel responsive to the change in concentration of the contrast agent, and calculate a perfusion metric for the selected voxel based on the another set of magnetic signals and the arterial input function. The perfusion metric may be absolute mean transit time, relative cerebral blood flow, or relative cerebral blood volume if Gd is used as the contrast agent. Since absolute [dOHb] is known when dOHb is used as the contrast agent, absolute CBF and CBV may also be calculated. The processor may be further configured to classify the selected voxel as venous or arterial based on the perfusion metric, and the display may be further configured to output this classification. The processor may be further configured to identify an abnormality in the selected voxel based on the perfusion metric, and the display may be further configured to output the abnormality.

Optionally, the contrast agent is a gadolinium-based contrast agent and the display is further configured to output instructions to intravenously administer an amount of the gadolinium-based contrast agent to the subject sufficient to effect the change in concentration in the contrast agent.

Optionally, the contrast agent is deoxyhemoglobin and the system further includes a sequential gas delivery device for effecting the change in concentration of the contrast agent by targeting a first end-tidal partial pressure of oxygen and carbon dioxide in the subject, and then targeting a second end-tidal pressure of oxygen and carbon dioxide in the subject using sequential gas delivery.

In examples where the contrast agent is deoxyhemoglobin, the system may further include a sensor to measure a first end-tidal partial pressure of oxygen and carbon dioxide in the subject while the sequential gas delivery device targets the first end-tidal partial pressure of oxygen and carbon dioxide and measure a second end-tidal partial pressure of oxygen and carbon dioxide in the subject while the sequential gas delivery device targets the second end-tidal partial pressure of oxygen and carbon dioxide. The processor may be configured to convert the first and second end-tidal partial pressures of oxygen and carbon dioxide into a first and second concentration of deoxyhemoglobin respectively, temporally align the first and second concentrations of deoxyhemoglobin with the first and second magnetic signals. The time-concentration profile of this signal is the AIF.

Optionally, the processor may be further configured to compute the arterial input function for another voxel in the subject's choroid plexus and calculate a correlation coefficient for the reference voxel and the other voxel based on the respective timed concentration series. The processor may compare the respective correlation coefficients for the reference voxel and the another voxel, and based on the comparison, select the voxel with the most accurate AIF. The display may be configured to output the arterial input function for the selected voxel.

It is a further aspect of the specification to provide a non-transitory computer-readable machine medium comprising instructions for determining an arterial input function. The instructions may include inducing a change in concentration of a contrast agent in a subject; controlling a magnetic resonance imaging device to measure a set of magnetic signals in a reference voxel corresponding to the subject's choroid plexus responsive to the change in concentration of the contrast agent; computing an arterial input function based on the set of magnetic signals; and outputting the arterial input function at a display.

Optionally, the instructions include controlling the magnetic resonance imaging device to measure another set of magnetic signals in a selected voxel responsive to the change in concentration of the contrast agent. The instructions may further include calculating a perfusion metric for the selected voxel based on the set of magnetic signals measured at the selected voxel and further based on the arterial input function.

Optionally, the perfusion metric is absolute mean transit time, relative cerebral blood flow, or relative cerebral blood volume if Gd is used as the contrast agent. Since absolute [dOHb] is known when dOHb is used as the contrast agent, absolute CBF and CBV may also be calculated.

Optionally, the instructions include classifying the selected voxel as venous or arterial based on the perfusion metric and outputting the classification at the display.

Optionally, the instructions include identifying an abnormality in the selected voxel based on the perfusion metric and outputting the abnormality at the display.

Optionally, the contrast agent comprises a gadolinium-based contrast agent. The instructions may further include outputting instructions to intravenously administer an amount of the gadolinium-based contrast agent to the subject, the amount sufficient to induce the change of concentration of the contrast agent.

Optionally, the contrast agent is deoxyhemoglobin. The instructions to induce a change in concentration of the contrast agent may further include instructions for controlling a sequential gas delivery device to target a first end-tidal partial pressure of oxygen and carbon dioxide in the subject; and controlling the sequential gas delivery device to target a second end-tidal pressure of oxygen and carbon dioxide in the subject.

Optionally, the instructions further include measuring with a sensor a first end-tidal partial pressure of oxygen and carbon dioxide in the subject at the first concentration of the contrast agent; and measuring with the sensor a second end-tidal partial pressure of oxygen and carbon dioxide in the subject at the second concentration of the contrast agent. In order to compute the arterial input function, the instructions may include converting the first and second end-tidal partial pressures of oxygen and carbon dioxide into a first and second concentration of deoxyhemoglobin respectively, temporally aligning the first and second concentrations of deoxyhemoglobin with the first and second magnetic signals and providing a timed dOHb concentration series.

Optionally, the instructions further include controlling the magnetic resonance imaging device to measure another set of magnetic signals at another voxel in the subject's choroid plexus and recalculating the arterial input function for this voxel based on the magnetic signals. The instructions may further include selecting either the reference voxel or the another voxel with the preferred arterial input function and outputting the arterial input function for the selected voxel.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments are described with reference to the following figures.

DETAILED DESCRIPTION

List of Abbreviations

Figure 1:
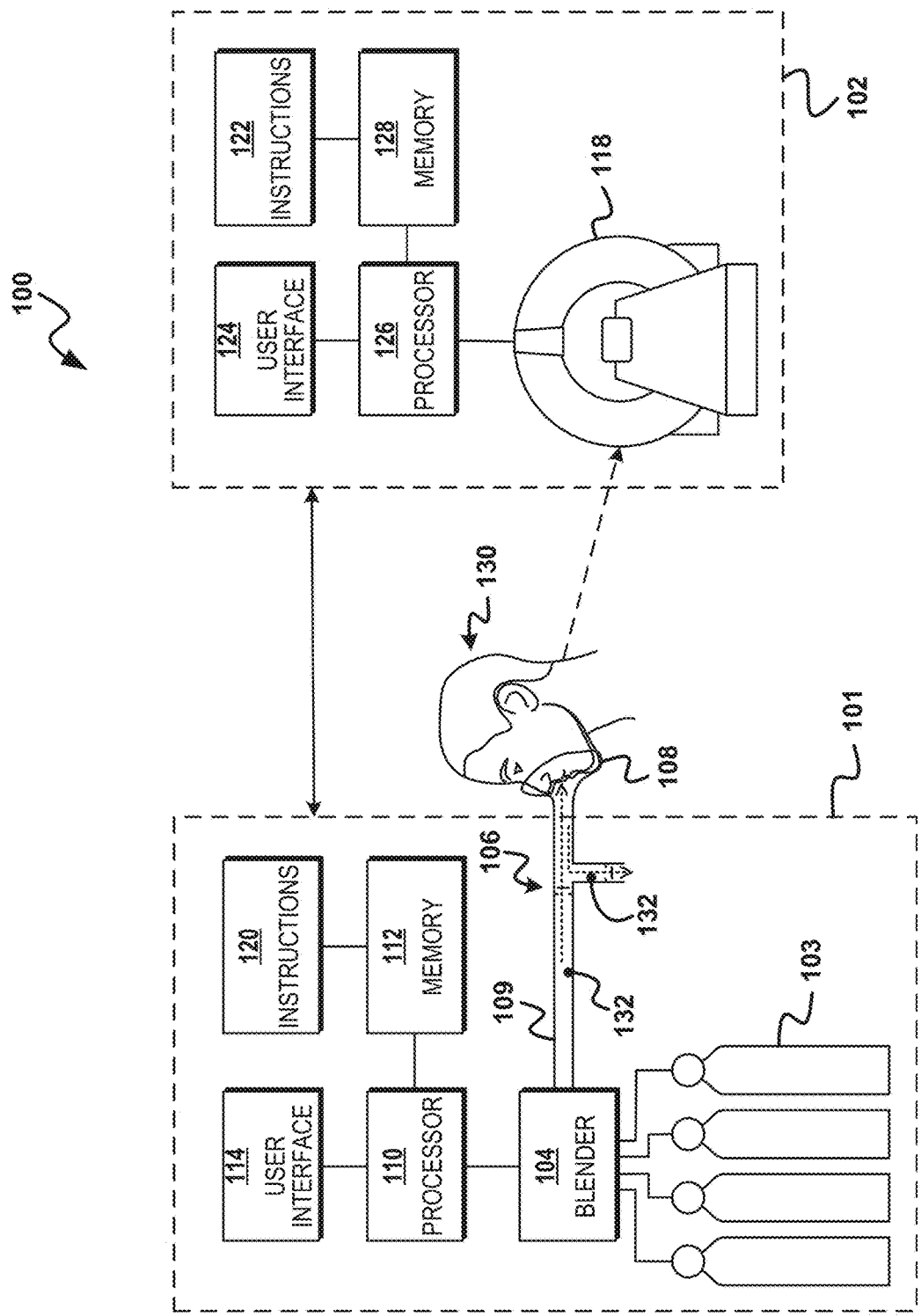
FIG. 1 is a block diagram of a system for determining the arterial input function in a subject.

"AIF" herein refers to arterial input function, which is the concentration of a contrast agent in a voxel measured over time.

"ASL" herein refers to arterial spin labelling, which is a method of labelling water molecules in the blood using a radiofrequency pulse and detecting the labelled water using magnetic resonance imaging in order to track blood flow non-invasively in vivo.

"BOLD" or "BOLD imaging" herein refers to blood oxygen level dependent imaging, a method of detecting in vivo changes in blood oxygenation using functional magnetic resonance imaging.

"CBF" herein refers to cerebral blood flow, which is a measure of the blood supply to a particular voxel in a given time period.

"rCBF" herein refers to relative cerebral blood flow, which is the CBF for a particular voxel, relative to a reference voxel.

"CBV" herein refers to cerebral blood volume, which is the volume of blood contained in a particular voxel.

"rCBV" herein refers to relative cerebral blood volume, which is CBV for a particular voxel, relative to a reference voxel.

"CP" herein refers to choroid plexus, an organ in the ventricles of the brain that produces CSF.

"CSF" herein refers to cerebral spinal fluid, which is a bodily fluid that bathes the central nervous system, providing mechanical and immunological protection thereto.

"dOHb" herein refers to deoxyhemoglobin. dOHb is the deoxygenated form of hemoglobin, the oxygen carrying protein found in red blood cells. Since dOHb is paramagnetic, it can be detected with magnetic resonance imaging.

"[dOHb]" herein refers to a concentration of deoxyhemoglobin in the blood.

"Gd" herein refers to gadolinium, a paramagnetic element used in magnetic resonance imaging as a contrast agent.

"GBCA" herein refers to a gadolinium-based contrast agent. Examples of a GBCA include gadobutrol, gadodiamide, gadoteridol, gadoteric acid, gadoversetamide, gadoxetic acid, and gadopentetic acid.

"GM" herein refers to gray matter.

"MCA" herein refers to the middle cerebral artery.

"MTT" herein refers to mean transit time, which is the average period of time that blood spends within a particular voxel.

"$P_aO_2$" herein refers to partial pressure of oxygen in arterial blood.

"$P_aCO_2$" herein refers to partial pressure of carbon dioxide in arterial blood.

"$P_{ET}O_2$" herein refers to partial pressure of oxygen in end tidal (i.e., end expired) breath.

"$P_{ET}CO_2$" herein refers to partial pressure of carbon dioxide in end tidal (i.e., end expired) breath.

"MRI" herein refers to magnetic resonance imaging.

"$S_aO_2$" herein refers to arterial hemoglobin saturation.

"TE" herein refers to echo time. In MRI, echo time is the time between the delivery of a pulse and the receipt of the echo signal.

"TR" herein refers to time of repetition. In MRI, time of repetition is the time between successive pulse sequences.

"WM" herein refers to white matter.

The present disclosure provides an improved method and system for determining the AIF by taking the AIF from a region of the choroid plexus as an alternative to that of the middle cerebral artery. The AIF obtained from the CP is more consistent than other methods because all vessels are arterialized and devoid of significant venous blood because the metabolic activity in the CP is negligible.

The present invention will be described with respect to the figures herein.

FIG. 1 is a block diagram of a system for determining a perfusion metric.

The system 100 comprises a sequential gas delivery (SGD) device 101 to provide sequential gas delivery to a subject 130. The SGD device 101 may target a $P_{ET}O_2$ while maintaining normocapnia. The SGD device 101 includes gas supplies 103, a gas blender 104, a mask 108, a processor 110, memory 112, and a user interface 114. The SGD device 101 may be configured to control $P_{ET}CO_2$ and $P_{ET}O_2$ by generating predictions of gas flows to actuate target end-tidal values. The SGD device 101 may be an RespirAct™ device, made by Thornhill Medical™ of Toronto, Canada, specifically configured to implement the techniques discussed herein. For further information regarding sequential gas delivery, U.S. Pat. No. 8,844,528, US Publication No. 2018/0043117, and U.S. Pat. No. 10,850,052, which are incorporated herein by reference, may be consulted.

The gas supplies 103 may provide carbon dioxide, oxygen, nitrogen, and air, for example, at controllable rates, as defined by the processor 110. A non-limiting example of the gas mixtures provided in the gas supplies 103 is:

a. Gas A: 10% $O_2$, 90% $N_2$;
b. Gas B: 10% $O_2$, 90% $CO_2$;
c. Gas C: 100% $O_2$; and
d. Calibration gas: 10% $O_2$, 9% $CO_2$, 81% $N_2$.

The gas blender 104 is connected to the gas supplies 103, receives gases from the gas supplies 103, and blends received gases as controlled by the processor 110 to obtain a gas mixture, such as a first gas (G1) and a second gas (G2) for sequential gas delivery.

The second gas (G2) is a neutral gas in the sense that it has about the same $PCO_2$ as the gas exhaled by the subject 130, which includes about 4% to 5% carbon dioxide. In some examples, the second gas (G2) may include gas actually exhaled by the subject 130. The first gas (G1) has a composition of oxygen that is equal to the target $P_{ET}O_2$ and preferably no significant amount of carbon dioxide. For example, the first gas (G1) may be air (which typically has about 0.04% carbon dioxide), may consist of 21% oxygen and 79% nitrogen, or may be a gas of similar composition, preferably without any appreciable $CO_2$.

The processor 110 may control the gas blender 104, such as by electronic valves, to deliver the gas mixture in a controlled manner.

The mask 108 is connected to the gas blender 104 and delivers gas to the subject 130. The mask 108 may be sealed to the subject's face to ensure that the subject only inhales gas provided by the gas blender 104 to the mask 108. In some examples, the mask is sealed to the subject's face with skin tape such as Tegaderm™ (3M, Saint Paul, Minnesota). A valve arrangement 106 may be provided to the SGD device 101 to limit the subject's inhalation to gas provided by the gas blender 104 and limit exhalation to the room. In the example shown, the valve arrangement 106 includes an inspiratory one-way valve from the gas blender 104 to the mask 108, a branch between the inspiratory one-way valve and the mask 108, and an expiratory one-way valve at the branch. Hence, the subject 130 inhales gas from the gas blender 104 and exhales gas to the room.

The gas supplies 103, gas blender 104, and mask 108 may be physically connectable by a conduit 109, such as tubing, to convey gas. One or more sensors 132 may be positioned at the gas blender 104, mask 108, and/or conduits 109 to sense gas flow rate, pressure, temperature, and/or similar properties and provide this information to the processor 110. Gas properties may be sensed at any suitable location, so as to measure the properties of gas inhaled and/or exhaled by the subject 130.

The processor 110 may include a central processing unit (CPU), a microcontroller, a microprocessor, a processing core, a field-programmable gate array (FPGA), an application-specific integrated circuit (ASIC), or a similar device capable of executing instructions. The processor may be connected to and cooperate with the memory 112 that stores instructions and data.

The memory 112 includes a non-transitory machine-readable medium, such as an electronic, magnetic, optical, or other physical storage device that encodes the instructions. The medium may include, for example, random access memory (RAM), read-only memory (ROM), electrically erasable programmable read-only memory (EEPROM), flash memory, a storage drive, an optical device, or similar.

The user interface 114 may include a display device, speaker, microphone, touchscreen, mouse, keyboard, buttons, the like, or a combination thereof to allow for operator input and/or output.

Instructions 120 may be provided to carry out the functionality and methods described herein. The instructions 120 may be directly executed, such as a binary file, and/or may include interpretable code, bytecode, source code, or similar instructions that may undergo additional processing to be executed. The instructions 120 may be stored in the memory 112.

The system 100 includes an MRI system 102 for detecting a contrast agent in the subject 130. A suitable MRI system may include an imaging device 118 such as a 3T MRI system (Signa HDxt™: GE Healthcare, Milwaukee). The MRI system 102 may further include a processor 126, memory 128, and a user interface 124. Any description of the processor 126 may apply to the processor 110 and vice versa. Likewise, any description of memory 128 may apply to memory 112 and vice versa. Similarly, any description of instructions 122 may apply to instructions 120 and vice versa. Also, any description of user interface 124 may apply to user interface 114, and vice versa. In some implementations, the MRI system 102 and the SGD device 101 share one or more of a memory, processer, user interface, and instructions, however, in the present disclosure, the MRI system 102 and the SGD device 101 will be described as having respective processors, user interfaces, memories, and instructions. The processor 110 of the SGD device 101 transmits data to the processor 126 of the MRI system 102. The system 100 may be configured to synchronize MRI imaging obtained by the imaging device 118 with measurements obtained by the sensor 132.

The processor 126 may retrieve operating instructions 122 from the memory or may receive operating instructions 122 from the user interface 124. The operating instructions 122 may include image acquisition parameters which the imaging device 118 is configured to implement to acquire images of the subject 130. The parameters may include an interleaved echo-planar acquisition consisting of a number of contiguous slices, a defined isotropic resolution, a diameter for the field of view, a repetition time (TR), and an echo time (TE). In one implementation, the number of contiguous slices is 27, the isotropic resolution is 3 mm, the field of view is 19.6 cm, the echo time is 30 ms, and the repetition time (TR) is 1500 ms, however a range of values will be apparent to a person of ordinary skill in the art. The operating instructions 122 may also include parameters for a high-resolution T1-weighted SPGR (Spoiled Gradient Recalled) sequence for co-registering BOLD images and localizing the arterial and venous components. The SPGR parameters may include a number of slices, a dimension for the partitions, an in-plane voxel size, a diameter for the field of view, an echo time, and a repetition time. In one implementation, the number of slices is 176 m, the partitions are 1 mm thick, the in-plane voxel size is 0.85 by 0.85 mm, the field of view is 22 cm, the echo time is 3.06 ms, and the repetition time (TR) is 7.88 ms.

The processor 126 may be configured to use image analysis software such as Matlab™ 2015a and AFNI (Cox, 1996) or other processes generally known in the art, to analyze images acquired by the imaging device 118. As part of the analysis, the processor 126 may be configured to perform slice time correction for alignment to the same temporal origin and volume spatial re-registration to correct for head motion during acquisition. The processor 126 may be further configured to perform standard polynomial detrending. In one implementation, the processor 126 is configured to detrend using AFNI software 3dDeconvolve to obtain detrended data.

Figure 2:
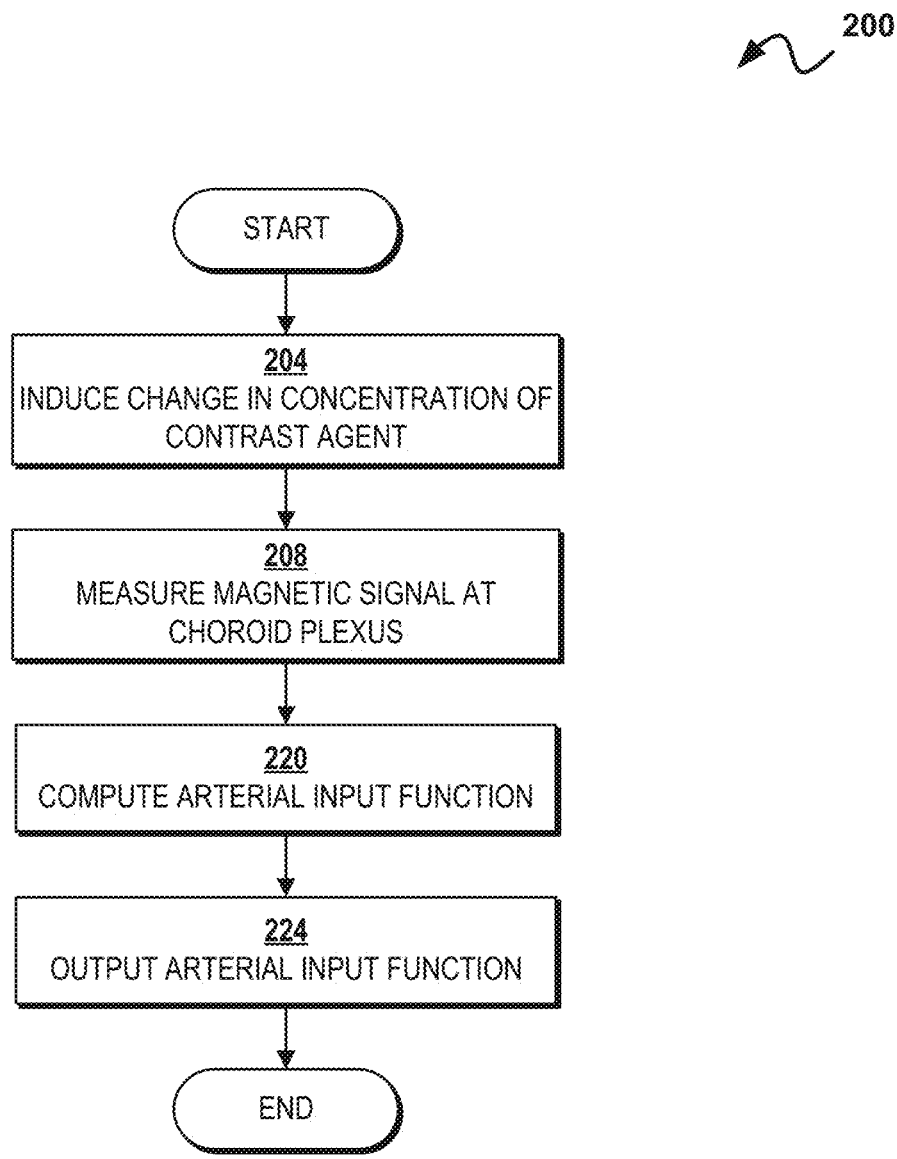
FIG. 2 is a flowchart of a method for determining the arterial input function in a subject.

As shown in FIG. 2, the system 100 may be configured to determine the arterial input function for the subject 130. FIG. 2 is a flowchart showing an example method for determining the arterial input function. The method 200 may be implemented by the system 100.

At block 204, the instructions 120 control the system 100 induces a change in the concentration of a contrast agent in the subject 130. Inducing a change in concentration of the contrast agent may be described as targeting a first concentration of a contrast agent in the bloodstream of the subject 130 and then targeting a second concentration of the contrast agent in bloodstream the subject 130. The first concentration of the contrast agent may be zero or a non-zero value. The second concentration of the contrast agent may be zero or a non-zero value, as long as the second concentration of the contrast agent is higher or lower than the first concentration of the contrast agent. The contrast agent may comprise deoxyhemoglobin or an intravenous contrast agent which has magnetic properties that influence the magnetic field of the MRI system 102. Deoxyhemoglobin and gadolinium are paramagnetic compounds which disrupt the magnetic field, reducing the measured magnetic signal.

In examples where the contrast agent comprises an intravenous contrast agent, the instructions 120 may control the user interface 124 to output instructions to inject the subject 130 with at the flow rate and concentration required to induce a change in the concentration in the subject 130. Examples of suitable intravenous contrast agents include gadolinium-based contrast agents (GBCA), iron-based contrast agents, and magnesium-based contrast agents. In some examples, the instructions output at block 204 indicate that no amount of contrast agent is to be injected and therefore the first concentration is approximately 0%. Subsequently, the instructions 120 may control the user interface 124 to output instructions to intravenously administer the contrast agent to the subject 130. The instructions may indicate the flow rate and concentration sufficient to target the second concentration of contrast agent in the subject 130. Any suitable amount of intravenous contrast agent may be injected into the subject 130. In a non-limiting example, the injection comprises administering 0.1 mmol/kg of gadobutrol at 5 ml/second to generate a 5-ml bolus. In other examples, the first concentration is a non-zero value.

In examples where the contrast agent comprises dOHb, the instructions 120 may control the SGD device 101 to induce a change in the subject's $P_aO_2$. The subject's $P_aO_2$ may be changed by controlling the SGD device 101 to target a first $P_{ET}O_2$ and then target a second $P_{ET}O_2$. The first $P_{ET}O_2$ may be higher or lower than the second $P_{ET}O_2$, In particular examples described herein, the second $P_{ET}O_2$ is lower than the first $P_{ET}O_2$. The first $P_{ET}O_2$ may be at or near normoxia and the second $P_{ET}O_2$ may be at or near hypoxia. In a non-limiting example, first $P_{ET}O_2$ is approximately 85 to 100 mmHg and the second $P_{ET}O_2$ is approximately 30-60 mmHg. In another non-limiting example, the first $P_{ET}O_2$ is approximately 95 mmHg and the second $P_{ET}O_2$ is approximately 40 mmHg. By targeting normoxia followed by hypoxia, a hypoxic bolus may be generated in the subject's pulmonary arteries which passes into the subject's tissues. After targeting a hypoxic value of $P_{ET}O_2$, a the SGD device 101 may again target a normoxic value of $P_{ET}O_2$ such that the bolus is transient. Targeting a hypoxic value of $P_{ET}O_2$ for brief amounts of time and returning to normoxia may produce adequate signals while reducing subject discomfort associated with hypoxia. The SGD device 101 may alternate between targeting the first and second $P_{ET}O_2$ any suitable number of times. The method is not limited to targeting two $P_{ET}O_2$ values and other patterns of $P_{ET}O_2$ are suitable as long as a measurable change in [dOHb] is induced.

Since carbon dioxide affects the dissociation of oxygen from hemoglobin, the SGD device 101 may also be programmed to control the subject's arterial partial pressure of carbon dioxide ($P_aCO_2$). While targeting the first and second $P_{ET}O_2$, the SGD device 101 may $P_aCO_2$ by targeting an end tidal partial pressure of carbon dioxide ($P_{ET}CO_2$). In one example, the SGD device 101 maintains the $P_{ET}CO_2$ while varying the $P_{ET}O_2$. In a particular example, the SGD device 101 selects the $P_{ET}CO_2$ to induce normocapnia in the subject 130.

The SGD device 101 may target the first $P_aO_2$ for long enough for the imaging device 118 to obtain a reliable measurement. The SGD device 101 may then target the second $P_aO_2$ and $P_aCO_2$ for long enough for the imaging device 118 to obtain a reliable measurement. The times spent targeting the first and second $P_aO_2$ may depend on the signal-to-noise ratio (SNR), and the duration may be reduced if the SNR can be reduced. In some examples, the SGD device 101 targets the first $P_aO_2$ for 15 seconds. In further examples, the SGD device 101 targets the first $P_aO_2$ for 30 seconds. In yet further examples, the SGD device 101 targets the first $P_aO_2$ for 60 seconds. In some examples, the SGD device 101 targets the second $P_aO_2$ and $PaCO_2$ for 15 seconds. In further examples, the SGD device 101 targets the second $P_aO_2$ and $PaCO_2$ for 30 seconds. In yet further examples, the SGD device 101 targets the second $P_aO_2$ and $PaCO_2$ for 60 seconds. The time spent targeting the first or second $P_aO_2$ and $PaCO_2$ may instead be based on the TR. In one example, the SGD device 101 targets the first $P_aO_2$ for at least five TR after the first $P_aO_2$ is reached. In another example, the SGD device 101 targets the second $P_aO_2$ for at least five TR after the second $P_aO_2$ and $PaCO_2$ is reached.

If the contrast agent is [dOHb], the instructions 120 may further control the sensor 132 to measure the subject's $P_{ET}O_2$ and $P_{ET}CO_2$ while inducing a change in the concentration of the contrast agent. The recorded $P_{ET}O_2$ may be stored in memory 112 in association with the time at which the measurement was obtained. This step may be skipped if the contrast agent is an intravenous contrast agent.

At block 208, the instructions 122 control the MRI system 102 to measure a set of magnetic signals responsive to the change in the concentration of contrast agent in the subject 130. The MRI system 102 measures the magnetic signals in a reference voxel that corresponds to a region of interest in the subject's choroid plexus (CP). In some examples, the MRI system 102 selects a voxel in the CP that is least affected by partial voluming, as determined by the strength of the first magnetic signal. In other examples, the MRI system 102 selects the reference voxel according to a user input received at the user interface 124. The MRI system 102 may also adjust the size of the reference voxel to minimize partial voluming. Voxel size may be determined according to the strength of the magnet, the field of view, the TR, and the TE. In one example, the voxel size is 3 mm. In another example, the voxel size is 1 mm. In a further example, the voxel size is 0.5 mm. In order to determine the change in magnetic signal over time, the MRI system 102 measures the magnetic signal in the reference voxel at least at two different times. In some examples, the MRI system 102 measures the magnetic signal in the reference voxel repeatedly as the concentration of the contrast agent changes. The measured magnetic signals may be stored in memory 112 in association with the respective time at which the measurements were obtained.

At block 220, the instructions 122 control the processor 126 to compute the arterial input function (AIF) for the subject 130. The AIF may be computed using techniques generally known in the art. Computing the AIF comprises analyzing the set of magnetic signals measured at blocks 208 against time. The AIF comprises the change in magnetic signal as a function of time.

If the contrast agent is [dOHb], the processor 126 may convert the measured $P_{ET}O_2$ into [dOHb] as part of block 220. The processor 126 may convert the first $P_{ET}O_2$ and the second $P_{ET}O_2$ into a first $S_aO_2$ and a second $S_aO_2$, respectfully. The conversion may be performed using the Hill Equation (shown below in Equation 1) or an equivalent calculation. In Equation 1, the dissociation constant (K) and the Hill coefficient (n) may be determined using methods described in Balaban, D. Y., et al. "The in-vivo oxyhaemoglobin dissociation curve at sea level and high altitude". *Respir. Physiol Neurobiol.* 186, 45-52 (2013), which is incorporated by reference herein. According to Balaban, n=−4.4921, pH+36.365, and K=$5.10^{-142}$ $pH^{157.31}$, wherein pH=7.4.

$$S_aO_2 = 100 \frac{K(P_{ET}O_2)^n}{1 + K(P_{ET}O_2)^n}$$ Equation 1

After determining the first and second $S_aO_2$ using the Hill Equation, the processor 126 may calculate a first and second [dOHb] using Equation 2, wherein [OHb] represents the concentration of oxyhemoglobin.

$$[dOHb]=[OHb]\times(1-S_aO_2)$$ Equation 2

Herein, [dOHb] may be used interchangeably with $S_aO_2$.

The instructions 122 may control the MRI system 102 to store the first and second [dOHb] in memory 128 in association with the set of magnetic signals and the time at which the respective measurements were acquired.

Since the bolus of contrast agent takes time to pass from the lungs to the choroid plexus, there will be a time delay between the input of contrast agent and the magnetic signal. To compare the concentration of contrast agent with the magnetic signals, the processor 126 may temporally align the [dOHb] measurements and the set of magnetic signals and regress the magnetic signal for the calculated [dOHb]. Based on the regression, the processor 126 may calculate a correlation coefficient r. The correlation coefficient r may be stored in memory 128. The processor 126 may further apply thresholding.

If the contrast agent is an intravenous contrast agent, the processor 126 may control the MRI system 102 to store the magnetic signals in memory 128 in association with the time at which the respective measurements were acquired. To obtain the AIF, the processor 126 analyzes the set of magnetic signals as a function of time. In other words, the AIF is the set of changes of the magnetic signal as a function of time.

At block 224, the instructions 122 control the processor 126 to output the AIF at the user interface 124. The AIF may be displayed as a function, spreadsheet, graph, or the like.

Even within the choroid plexus, there may be some variation resulting in different AIFs. In the comparison between different voxels, blocks 204 to 220 may be repeated or performed in parallel for two or more reference voxels in the choroid plexus, resulting in the calculation of two or more AIFs. While measuring a first set of magnetic signals in a first reference voxel, the MRI system 102 may also measure a second set of magnetic signals in a second reference voxel. The processor 126 may then calculate a first and second arterial input function corresponding to the first and second reference voxels.

Based on the AIF determined at block 220, the processor 126 may compute a perfusion metric for the reference voxel or for a different selected voxel. The perfusion metric may be absolute mean transit time, relative cerebral blood flow, or relative cerebral blood volume if an intravenous contrast agent is used as the contrast agent. Since absolute [dOHb] is known when dOHb is used as the contrast agent, absolute cerebral blood flow and absolute cerebral blood volume may also be calculated. The selected voxel is not limited to the choroid plexus and may correspond with any other region in the subject's body. In order to calculate a perfusion metric for selected voxel, the imaging device 118 measures a set of magnetic signals in the selected voxel responsive to the change in concentration of the contrast agent. The set of magnetic signals for the selected voxel may be stored in memory 128 in association with the time at which the measurements were acquired. Based on the set of magnetic signals at the selected voxel, the processor 126 may calculate a perfusion metric for the selected voxel using methods generally known in the art. The imaging device 118 may measure magnetic signals from any number of voxels.

The processor 126 may control the user interface 124 to output one or more perfusion metrics calculated for the selected voxel. In one example, the user interface 124 may display a magnetic resonance image that is aligned with a perfusion map indicating the value of a perfusion metric for one or more voxels in the subject's body.

Furthermore, the processor 126 may use the collected data to classify a voxel as arterial or venous. Voxels containing arterial or venous vessels can be identified based on one or more of the following data: perfusion metrics, signal size, signal delay time, and signal profile. After classifying one or more voxels according to vessel type, the processor 126 may generate a venogram of the subject's organ. The user interface 124 may output the venogram at a display.

By identifying reductions in the correlation between AIF and the magnetic signal, the processor 126 may also identify an abnormality in arterial branches and arterial beds in the subject's brain or other organ. Reductions in the correlation between AIF and the magnetic signal in what should be an arterial bed may indicate abnormal characteristics resulting from asymmetrical vessel perfusion which can be caused by blood bypassing the normal sequential branching of the arterial tree and instead obtain perfusion from neovascularization, development of collateral blood flow, arterial-arterial malformation, angioma formation, and arterial-venous malformation. Unilateral conditions would result in side-to-side asymmetry in vascular pattern, blood arrival time, cerebral blood volume, mean transit time, and cerebral blood flow as well as asymmetrical patterns of vessel filling. The processor 126 may also identify abnormal structures in the subject 130 such as vascular tumors and cysts, hemangiomas, arterio-venous malformations, arterio-venous fistulas, and arterial aneurisms. After identifying an abnormality, the processor 126 may control the user interface 124 to display images color coded according to a pre-selected color scheme, indicating the magnitude of hemodynamic parameters such as arrival time, cerebral blood flow, and cerebral blood volume. The color scheme may outline vascular patterns of arteries and veins from which abnormal vessel configurations, sizes, and direction of coursing indicates the presence of the abnormality. The processor may control the user interface 124 to display an alert including information that characterizes the abnormality. The alert may include information that locates the abnormality in the subject's body, for example by displaying a magnetic resonance image that indicates which voxel or voxels correspond to the abnormality.

The processor 126 may also compute and output the tissue oxygen extraction for a vein. If a vein is identified as draining a particular part of the body, for example the vein of Rosenthal drains the medial surface of the temporal lobe and runs posteriorly and medially to drain into the vein of Galen. By knowing the AIF, the arterial oxygen concentration perfusing the temporal lobe is known. By then interrogating the venous oxygen saturation of this vein, the oxygen extraction fraction of the temporal lobe can be computed. After calculating absolute CBF using dOHb as contrast, as disclosed herein, the actual oxygen extraction of the temporal lobe is calculated. The temporal lobe function is crucial in cognition and reduction in oxygen extraction is an early marker of impending dementia. By computing the [dOHb] in the AIF and, for example, the Vein of Rosenthal, the processor 126, at block 220 can calculate the oxygen extraction of the temporal lobe.

Example 1

In Example 1 described herein, the system 100 was programmed to acquire BOLD-MRI in subjects and compare the AIFs calculated using the MCA with the AIFs calculated using the CP.

Figure 3:
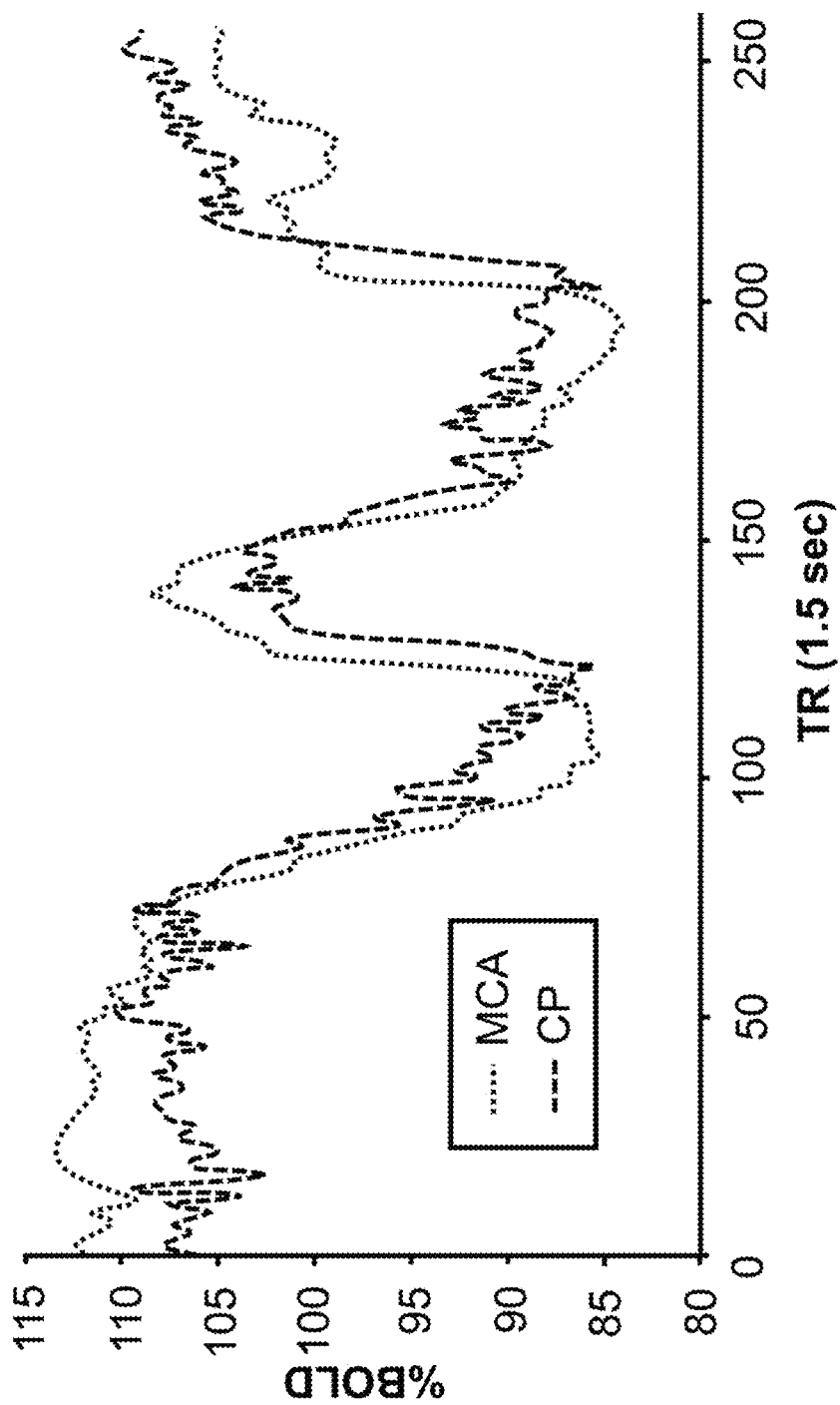
FIG. 3 is a graph of results generated by exemplary performance of the method of FIG. 2.
Figure 4:
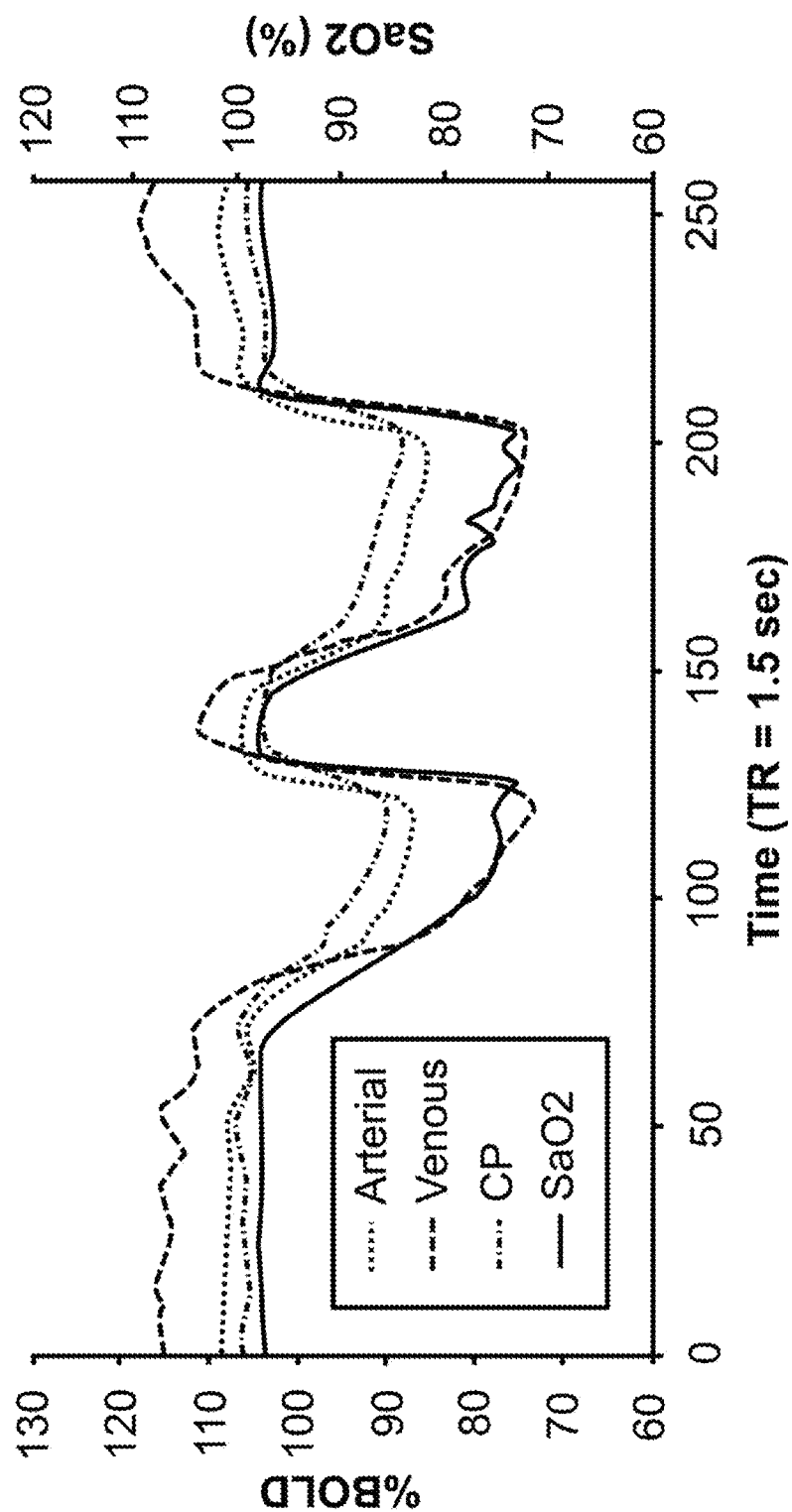
FIG. 4 is another graph of results generated by exemplary performance of the method of FIG. 2.

Methods: Eight healthy subjects (6 female, age 23-60 years) and one subject with known steno-occlusive disease, were imaged using the imaging device 118 of FIG. 1 and end-tidal $O_2$ ($P_{ET}O_2$) and $CO_2$ ($P_{ET}CO_2$) concentrations were controlled using the SGD device 101. In this example, the imaging device 118 was a 3T MR scanner using an 8-channel receive only head coil and the SGD device 101 was RespirAct™ (Thornhill Medical, Toronto, Canada). A BOLD acquisition with TR/TE=1500/30 ms, flip angle=73°, 29 slices, voxel size of 3 mm isotropic and matrix size of 64×64 was acquired during $P_{ET}O_2$ manipulation while maintaining normocapnia during a 4 min 20 second scan. The gas manipulation consisted of a 60 s baseline $P_{ET}O_2$ of 95 mmHg (normoxia), followed by a step decrease in $P_{ET}O_2$ to 40 mmHg (hypoxia) for 60 seconds, a return to normoxia was then applied for 20 seconds, followed by a similar timed hypoxic period, as shown in FIGS. 3 and 4. FIG. 3 shows a [dOHb] sequence for a healthy subject as a voxel time series wherein the BOLD signal is measured in the 300 or the CP. FIG. 4 shows the average BOLD signal measured in arterial voxels (% BOLD>20%, R>0.8, and time delay (TD)<1.5s), venous voxels (% BOLD>20%, R>0.8, and 3<TD<5 s), and CP voxels plotted alongside the oxygen saturation (SaO$_2$) as calculated from the $P_{ET}O_2$.

The healthy subjects underwent an additional BOLD sequence with the same parameters where an intravenous injection of GBCA (5 ml bolus using 0.1 mmol/kg of gadobutrol at 5 ml/sec) was administered. A voxel from the MCA (GBCA-MCA) and the CP (GBCA-CP) were selected for BOLD AIF determination during the [dOHb] bolus as well as the GBCA bolus. A parametrized method for deconvolving and fitting the residue function with an exponential was used to calculate mean transient time (MTT) and relative cerebral blood volume (rCBV) for each AIF selection. Relative cerebral blood flow (rCBF) was calculated as rCBF=rCBV/MTT. Average perfusion metrics were calculated for gray (GM) and white matter (WM).

Results: The [dOHb] and GBCA signals were similarly resolved in the MCA and CP (compare FIGS. 3-4). As expected, the change in the CP signal followed the drop in arterial signal and preceded the venous signal in both DSC methods. The spatial maps of resting perfusion metrics using AIFs from the MCA and CP are very similar (shown in color in FIG. 5A and in grayscale in FIG. 5B). In the color images shown in FIG. 5A, the highest perfusion metrics are indicated in red. In the grayscale images shown in FIG. 5B, the highest perfusion metrics are indicated by the darkest regions of the subject's brain: the highest MTT values are indicated at 502; the highest rCBF values are indicated at 504; and the highest rCBV values are indicated at 506. Significant differences were found for rCBV in both GM (P=0.028, ∝=0.05) and WM (P=0.042, ∝=0.05) comparing the CP and MCA AIFs for GBCA. For the [dOHb] protocol, statistically significant differences were found between MTT AIF-CP and AIF-MCA for GM and WM (GM P=0.042 & WM P=0.021, ∝=0.05).

Figure 5A:
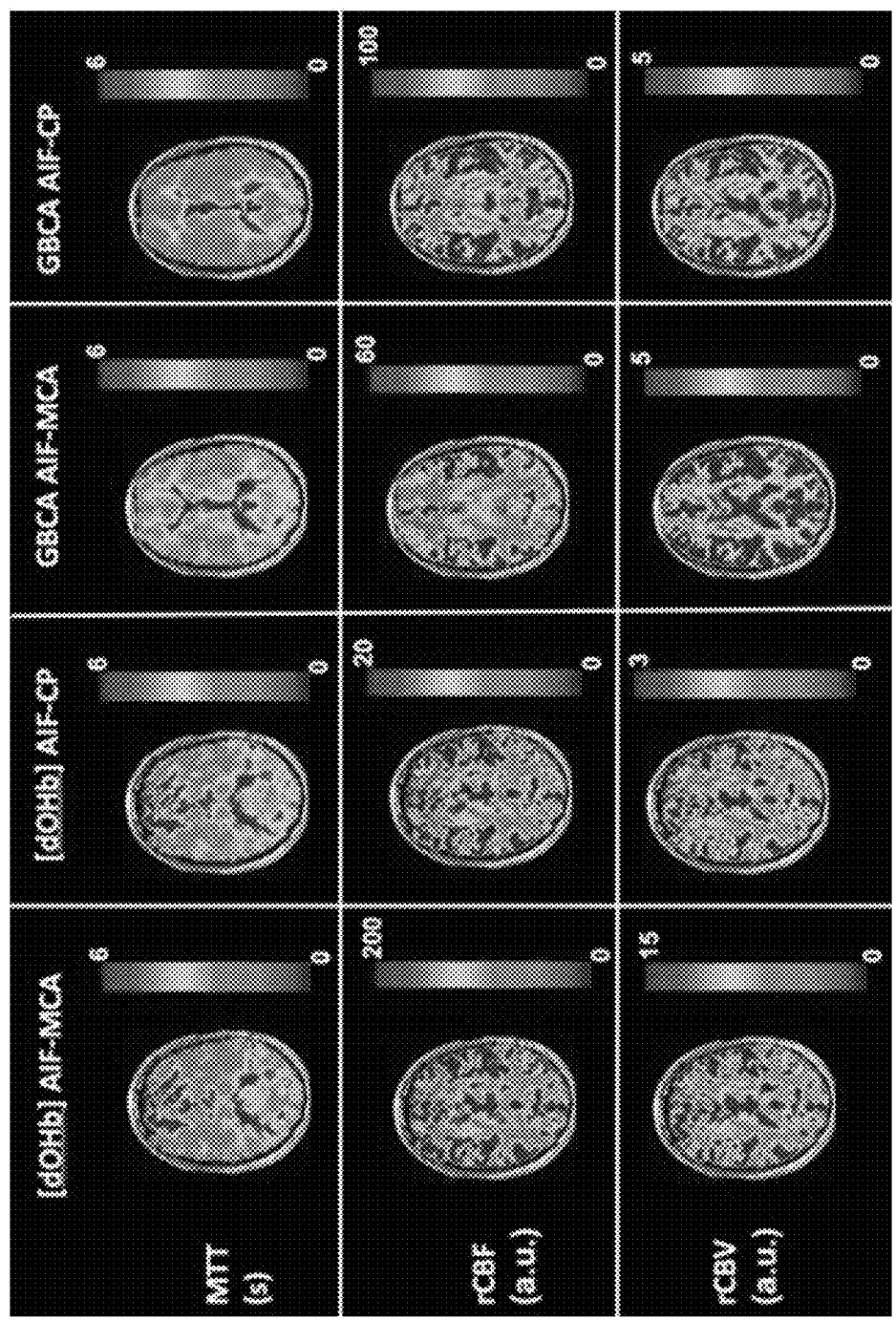
FIG. 5A is a set of BOLD images generated by exemplary performance of the method of FIG. 2.
Figure 5B:
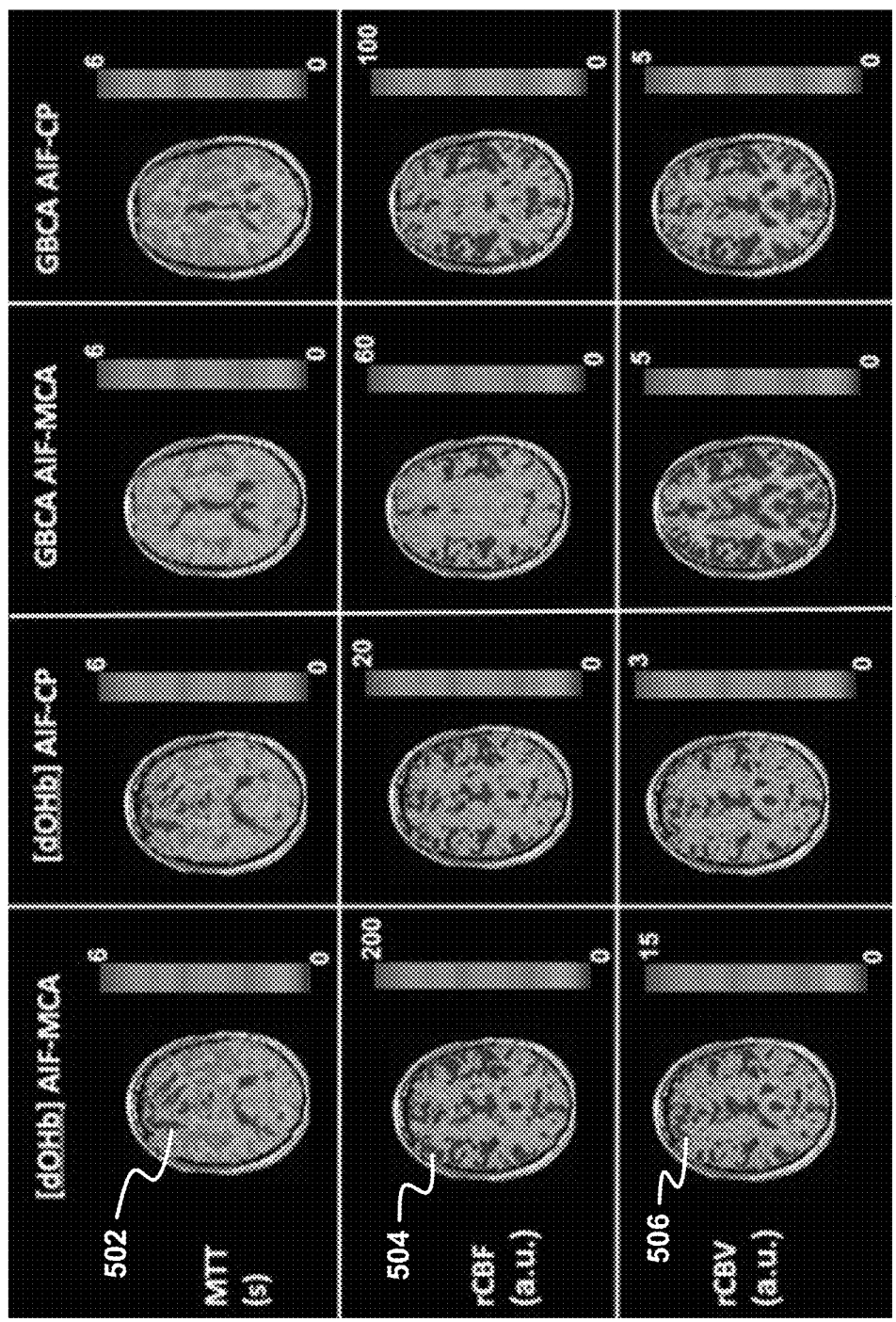
FIG. 5B is a copy of FIG. 5A in grayscale.
Figure 6C:
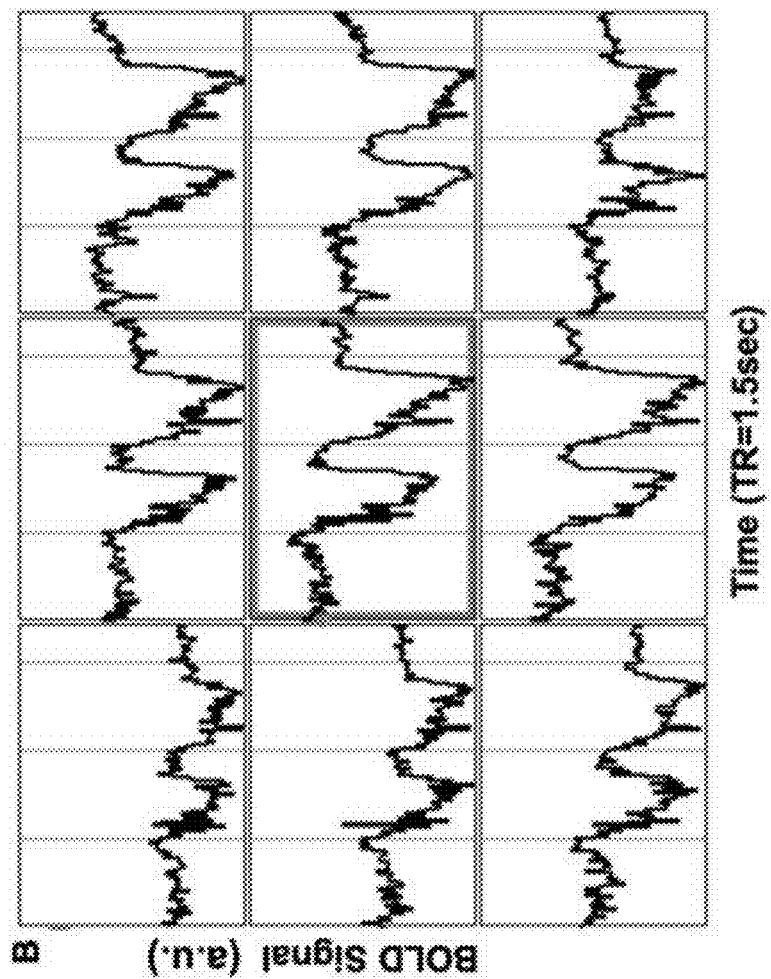
FIG. 6C is a set of graphs displaying the BOLD signal for the voxel indicated in FIGS. 6A and 6B, the graphs generated by exemplary performance of the method of FIG. 2.
Figure 6A:
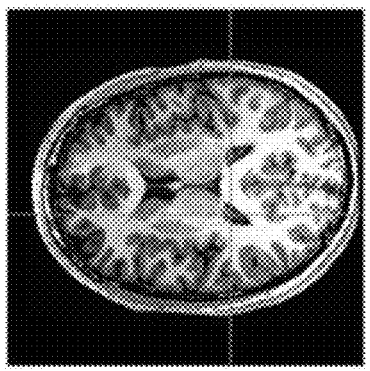
FIG. 6A is a T1 map of a subject's brain with crosshairs indicating a voxel in the choroid plexus.
Figure 6B:
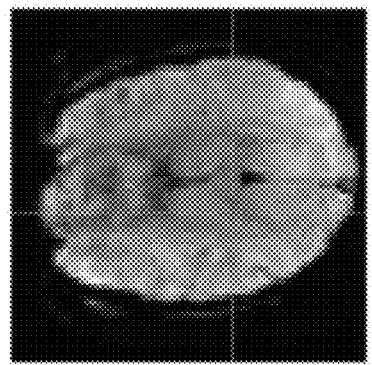
FIG. 6B is a BOLD image of the subject's brain of FIG. 6A generated by exemplary performance of the method of FIG. 2.

Discussion: As shown in FIGS. 6A-C, multiple locations in the CP yielded near identical signal changes that could be used as an AIF. FIG. 6A shows a T1-weighted axial slice and FIG. 6B shows the corresponding BOLD image with crosshairs indicating a selected voxel in the choroid plexus. FIG. 6C shows a set of graphs indicating the BOLD signal for the selected voxel (center) and voxels adjacent the selected voxel. FIGS. 5A and 5B show that maps of the perfusion metrics for the AIF-CP and AIF-MCA were similar for both GBCA and [dOHb]. Statistical differences in similar-appearing distributions of perfusion measures may be due to the large differences in SNR between [dOHb] and GBCA as well as the differences in the magnitude and shape of the AIF at each location.

Figure 7A:
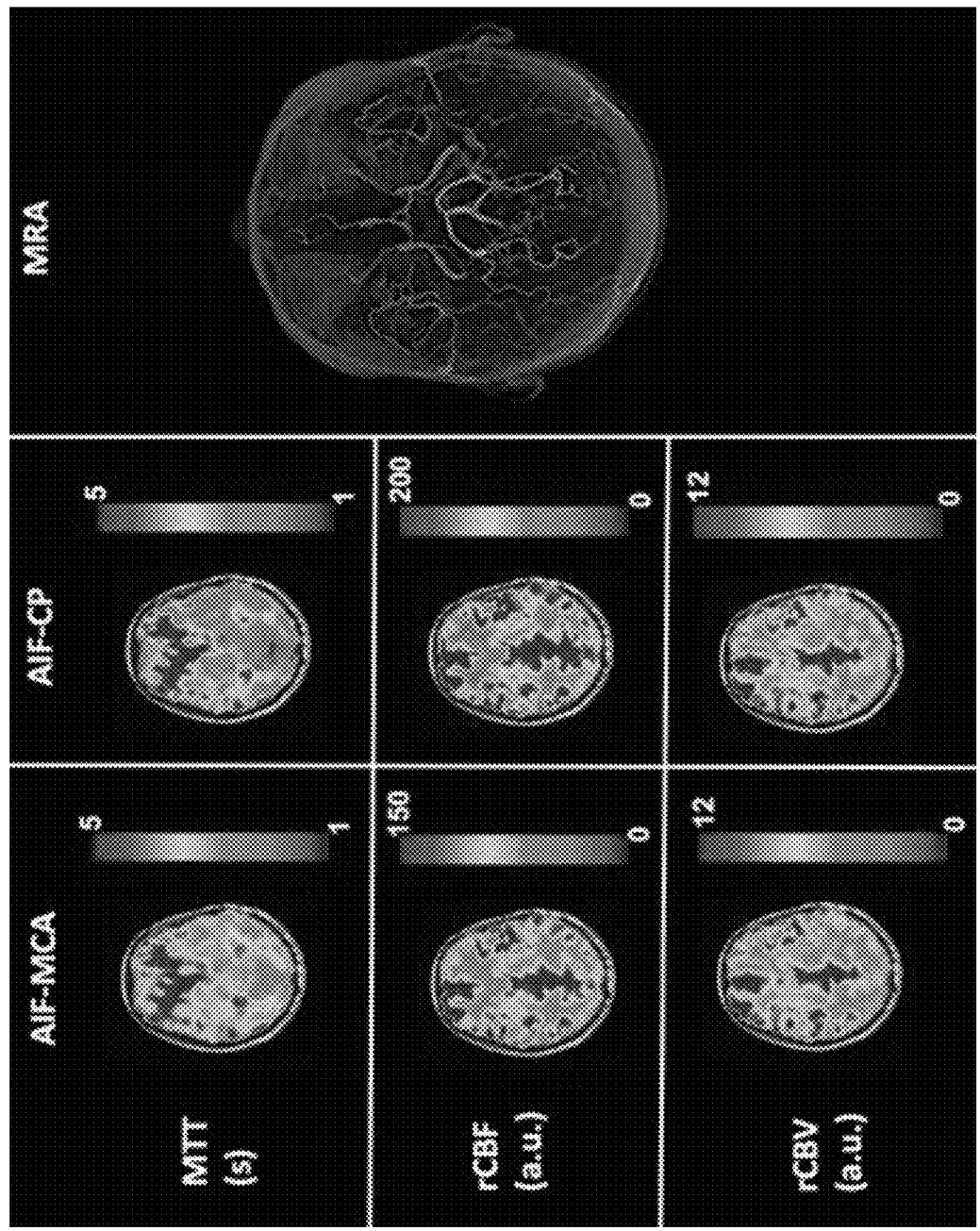
FIG. 7A is a set of BOLD images generated by exemplary performance of the method of FIG. 2.
Figure 7B:
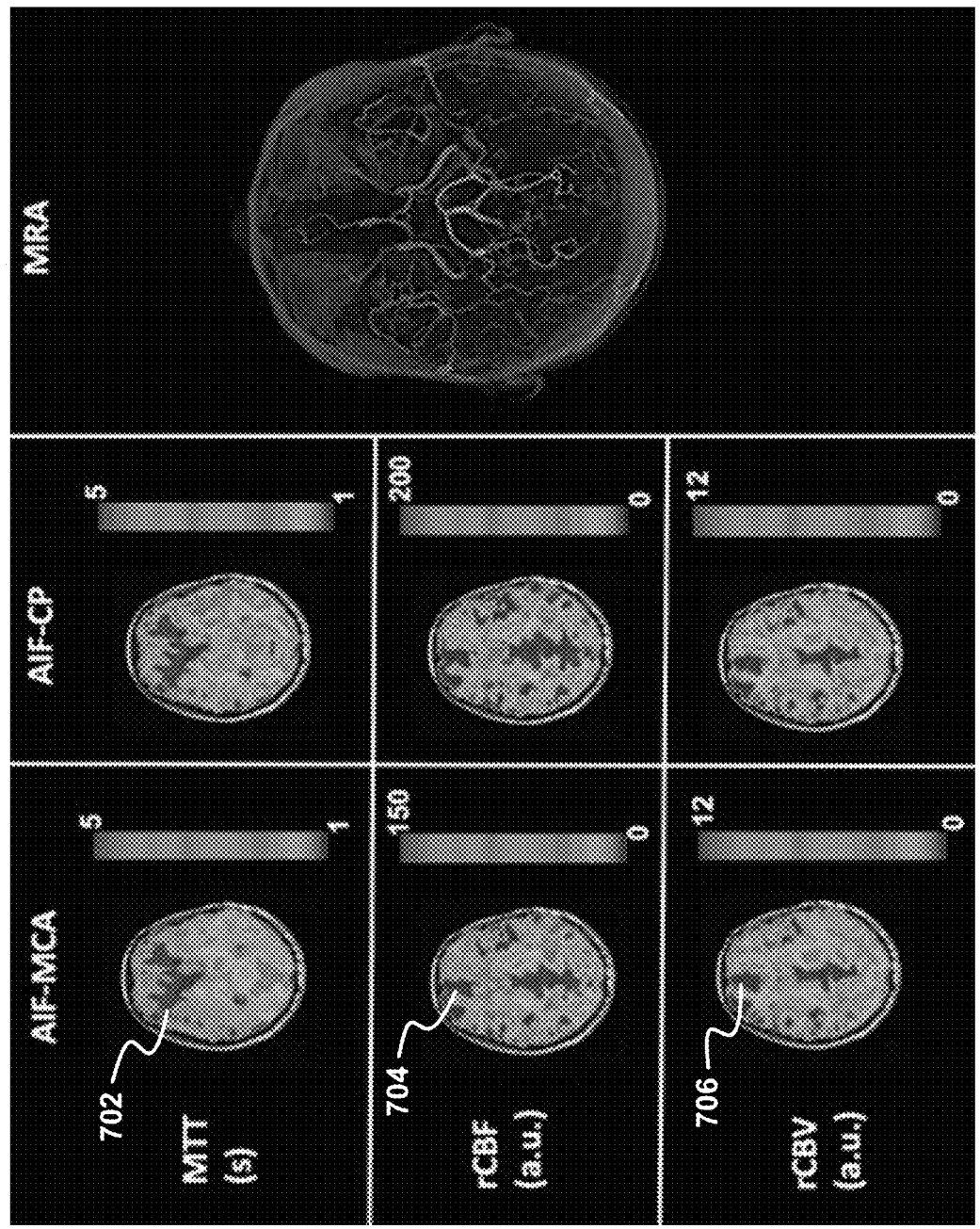
FIG. 7B is a copy of FIG. 7A in grayscale.

The advantage of selecting the CP to determine the AIF is that the CP resides in a homogenous BO magnetic environment as opposed to the MCA which is frequently located in regions of BO field inhomogeneity secondary to the susceptibility effects caused by the skull base distorting the bolus signal. Furthermore, the CP behaves like an arterial structure by virtue of its unique structure and function as seen by the similarity in bolus shapes for the passage of [dOHb] and GBCA boluses. There is little metabolic activity and therefore little consumption of oxygen compared to neural tissue. The CP is therefore a suitable alternate structure for deriving the AIF for GBCA and [dOHb] bolus methods for generating perfusion metrics, particularly when there is uncertainty regarding signal sampling in the MCA, as shown in color in FIG. 7A and in grayscale in FIG. 7B. FIGS. 7A and 7B show a set of perfusion maps calculated from [dOHb] using an AIF selected from the MCA (left) and the CP (right) for a subject with bilateral moyamoya disease. Also displayed is the subject's magnetic resonance angiogram (right). In the color images shown in FIG. 7A, the highest perfusion metrics are indicated in red. In the corresponding grayscale images shown in FIG. 7B, the highest perfusion metrics are indicated by the darkest regions of the subject's brain: the highest MTT values are indicated at 702; the highest rCBF values are indicated at 704; and the highest rCBV values are indicated at 706.

Due to its degree of arterialization and its large cross-sectional area, the CP can more reliably provide an accurate AIF profile than the interrogation of the MCA. The CP protrudes about 3 to 3.5 mm into ventricles of the brain. In fact, the CP is wider than any artery in the brain and thus can serve as a preferred target location from which to calculate the arterial input function (AIF). When using susceptibility contrast and a cranial artery such as the MCA to determine the AIF, one frequently finds the voxel size is near or exceed the MCA in size. When focusing on MCA, there is often substantial overlap of voxels with tissues, leading to "partial voluming"—an effect that leads to underestimation of the arterial concentration-time integral and overestimation of flows. Due to the size of arteries in the CP, this source of error is more rare. Furthermore, the size of the CP is not significantly affected by age or sex making it suitable for longitudinal and horizontal studies. An infant's CP is approximately the same size as an adult's CP. Therefore, the organ provides a consist and reliable measurement Because the CP has little tissue and thus relatively little oxygen consumption relative to supply, blood passes through the CP with little change in hemoglobin oxygen saturation. This improves the accuracy of the AIF, as compared with prior art methods which relied on cranial arteries.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for measuring perfusion metrics comprising:
   (a) inducing a change in concentration of deoxyhemoglobin in a subject,
   wherein inducing the change in concentration of deoxyhemoglobin comprises:
      targeting a first end-tidal partial pressure of oxygen ($P_{ET}O_2$) and carbon dioxide ($P_{ET}CO_2$) in the subject using a sequential gas delivery device; and
      targeting a second $P_{ET}O_2$ and $P_{ET}CO_2$ in the subject using the sequential gas delivery device;
   (b) measuring a set of magnetic signals for a reference voxel corresponding to a region of interest in the subject's choroid plexus, the set of magnetic signals responsive to the change in concentration of deoxyhemoglobin;
   (c) calculating an arterial input function based on the set of magnetic signals for the reference voxel; and
   (d) outputting the arterial input function at a display.

2. The method of claim 1 further comprising:
   measuring a set of magnetic signals for a selected voxel responsive to the change in concentration of deoxyhemoglobin; and
   calculating a perfusion metric for the selected voxel based on the set of magnetic signals for the selected voxel and the arterial input function.

3. The method of claim 1 further comprising:
   measuring a set of magnetic signals for another voxel corresponding with the subject's choroid plexus;
   recalculating the arterial input function based on the another set of magnetic signals; and
   selecting one of the reference voxel or the another voxel based on the respective arterial input functions;
   wherein outputting the arterial input function comprises outputting the arterial input function for the selected voxel.

4. A system for measuring perfusion metrics, the system comprising:
   a magnetic resonance imaging device configured to measure a set of magnetic signals for a reference voxel corresponding to a region of interest in the subject's choroid plexus, the set of magnetic signals responsive to a change in concentration of deoxyhemoglobin in the subject;
   a sequential gas delivery device configured to induce the change in concentration of deoxyhemoglobin by targeting a first end-tidal partial pressure of oxygen ($P_{ET}O_2$) and $P_{ET}CO_2$ in the subject and targeting a second $P_{ET}O_2$ and $P_{ET}CO_2$ in the subject;
   a processor configured to receive the set of magnetic signals from the magnetic resonance imaging device and further configured to compute an arterial input function based on the set of magnetic signals; and
   a display configured to receive the arterial input function from the processor and further configured to output the arterial input function.

5. The system of claim 4:
   wherein the magnetic resonance imaging device is further configured to measure a set of magnetic signals for a selected voxel responsive to the change in concentration of deoxyhemoglobin; and
   wherein the processor is further configured to calculate a perfusion metric for the selected voxel based on the set of magnetic signals for the selected voxel and the arterial input function.

6. The system of claim 4:
   wherein the magnetic resonance imaging device is further configured to measure another set of magnetic signals for another voxel corresponding with the subject's choroid plexus;
   wherein the processor is further configured to: recalculate the arterial input function based on the another set of magnetic signals and select one of the reference voxels or the another voxel based on the respective arterial input functions; and
   wherein the display is further configured to output the arterial input function for the selected voxel.

7. A non-transitory computer-readable machine medium comprising instructions for:
   (a) outputting instructions to induce a change in concentration of deoxyhemoglobin in a subject,
   wherein the instructions to induce the change in concentration of deoxyhemoglobin in a subject comprise instructions for controlling a sequential gas delivery device to target a first end-tidal partial pressure of oxygen ($P_{ET}O_2$) and $P_{ET}CO_2$ in the subject and target a second $P_{ET}O_2$ and $P_{ET}CO_2$ in the subject;
   (b) controlling a magnetic resonance imaging device to measure a set of magnetic signals for a reference voxel corresponding to a region of interest in the subject's choroid plexus responsive to the change in concentration of deoxyhemoglobin;
   (c) computing an arterial input function based on the set of magnetic signals; and
   (d) outputting the arterial input function at a display.

8. The non-transitory computer-readable machine medium of claim 7 further comprising instructions for:
   controlling the magnetic resonance imaging device to measure a set of magnetic signals for a selected voxel responsive to the change in concentration of deoxyhemoglobin; and
   calculating a perfusion metric for another selected voxel based on the set of magnetic signals for the selected voxel and the arterial input function.

9. The non-transitory computer-readable machine medium of claim 7 further comprising instructions for:
   controlling the magnetic resonance imaging device to measure another set of magnetic signals at another voxel in the subject's choroid plexus;
   recalculating the arterial input function based on the another set of magnetic signals; and
   selecting one of the reference voxel or the another voxel based on the respective arterial input functions;
   wherein outputting the arterial input function comprises outputting the arterial input function for the selected voxel.

* * * * *